(12) United States Patent
Gebert et al.

(10) Patent No.: US 7,896,942 B2
(45) Date of Patent: Mar. 1, 2011

(54) PLATE-SHAPED FILTER INSERT

(75) Inventors: Hans Gebert, Heilbronn (DE); Hans Waibel, Remseck/Aldingen (DE)

(73) Assignee: Mahle International GmbH, Stuttgart (DE)

( * ) Notice: Subject to any disclaimer, the term of this patent is extended or adjusted under 35 U.S.C. 154(b) by 260 days.

(21) Appl. No.: 12/094,249

(22) PCT Filed: Dec. 13, 2006

(86) PCT No.: PCT/DE2006/002230

§ 371 (c)(1),
(2), (4) Date: May 19, 2008

(87) PCT Pub. No.: WO2007/076798

PCT Pub. Date: Jul. 12, 2007

(65) Prior Publication Data

US 2008/0245038 A1    Oct. 9, 2008

(30) Foreign Application Priority Data

Dec. 24, 2005 (DE) ............... 10 2005 062 209

(51) Int. Cl.
*B01D 46/00* (2006.01)
(52) U.S. Cl. .................. 55/502; 55/497; 55/511; 55/521; 55/DIG. 31
(58) Field of Classification Search .......... 55/497, 55/502, 511, 521, DIG. 31, 495
See application file for complete search history.

(56) References Cited

U.S. PATENT DOCUMENTS 5,030,264 A * 7/1991 Klotz et al. ............... 55/481
5,125,941 A * 6/1992 Ernst et al. ............... 55/480
5,725,624 A * 3/1998 Ernst et al. ............... 55/502

(Continued)

FOREIGN PATENT DOCUMENTS

DE    8709100    10/1987

(Continued)

OTHER PUBLICATIONS

English abstract for DE 10249110, published Apr. 29, 2004.*

(Continued)

*Primary Examiner*—Michael A Marcheschi
*Assistant Examiner*—Robert A Clemente
(74) *Attorney, Agent, or Firm*—Rader, Fishman & Grauer PLLC

(57) ABSTRACT

A plate-shaped filter insert for, in particular, a gas filter with a seal which projects outward on a first of two opposite plate surfaces should be simple and inexpensive to produce with good durability. For this purpose, such a filter insert has the following features: —the filter material (1) is designed as a web material folded in a zigzag shape, each of whose folds on the top side are sealed by a first sealant strip (2), —the first sealant strips (2) each project bent outward at one of the two opposite upper plate sides formed by the backs of the folds, —at the end folds lying in longitudinal direction of the web material, a second sealant strip (3) running transverse to this longitudinal direction is attached, —the second sealant strips (3) are each bonded tightly to the first sealant strips (2), —a circumferential sealant material (4) is applied to the first and second sealant strips (2, 3) bonded tightly to one another.

7 Claims, 1 Drawing Sheet

U.S. PATENT DOCUMENTS

| | | | |
|---|---|---|---|
| 6,217,627 B1 * | 4/2001 | Vyskocil et al. | 55/492 |
| 6,454,826 B2 * | 9/2002 | Fath et al. | 55/490 |
| 6,780,217 B1 * | 8/2004 | Palmer | 55/502 |
| 6,833,017 B2 * | 12/2004 | Quigley | 55/497 |
| 2003/0177745 A1 * | 9/2003 | Jauw | 55/497 |
| 2005/0022490 A1 * | 2/2005 | Huang et al. | 55/486 |
| 2007/0125052 A1 * | 6/2007 | Holzmann et al. | 55/502 |

FOREIGN PATENT DOCUMENTS

| | | |
|---|---|---|
| DE | 4138948 | 6/1992 |
| DE | 4323523 | 1/1995 |
| DE | 4330333 | 3/1995 |
| DE | 19735992 | 2/1999 |
| DE | 20010383 | 10/2000 |
| DE | 20017121 | 11/2001 |
| DE | 10249110 | 4/2004 |
| DE | 10249110 A1 * | 4/2004 |
| EP | 0490169 | 2/1995 |
| EP | 0948985 | 10/1999 |
| WO | WO 0213947 A1 * | 2/2002 |

OTHER PUBLICATIONS

Machine translation of the description of DE 4138948, published Jun. 11, 1992.*
English abstract provided for EP-0948985.
English abstract provided for EP-0490169.
English abstract provided for DE-4330333.
English abstract provided for DE-4323523.
English abstract provided for DE-19735992.
English abstract provided for DE-4138948.
English abstract provided for DE-10249110.

* cited by examiner

PLATE-SHAPED FILTER INSERT

CROSS-REFERENCE TO RELATED APPLICATION

This application is a U.S. national phase of International application PCT/DE 2006/002230 filed Dec. 13, 2006, which claims priority to German application DE 10 2005 06 2209.7 filed Dec. 24, 2005, which are hereby incorporated by reference in their entirety.

The invention relates to a plate-shaped filter insert

Such a filter insert is known from DE 87 09 100 U1.

A similar plate filter insert in which the filter pleats are sealed by a sealing strip at the end is known from EP 0 490 169 B1.

The present invention addresses the problem of being able to manufacture a generic filter insert especially easily and inexpensively with nevertheless a given high manufacturing quality and durability.

This problem is solved with a generic filter as described below

The invention is based on the general idea of creating a peripheral support that is easy to manufacture for an elastic sealing compound to be applied on a top side of a plate. The elastic sealing compound may be foamable polyurethane in particular, which is a known sealing material for such sealing functions. The support is formed by a first sealing strip that seals the folds on the end faces of the folded sheet material used as the filter material, said sealing strip being bent by 90° to form the laterally protruding support. The support at the ends of the plate filter situated in the longitudinal direction of the sheet is formed by second sealing strips applied in the plane of the first sealing strips. These second sealing strips are glued onto the freely terminated edge of the last fold, for example, and connected tightly to the first sealing strip. To achieve a tight connection to the first sealing strip, the second sealing strips are applied opposite the first sealing strips.

The elastic sealing compound in the form of a strand of material produced continuously is applied to the peripheral support thereby formed by the two sealing strips. In applying a polyurethane foam base material, a foaming process takes place after applying the base material.

To ensure the most stable possible bond between the angled areas of the first sealing strip over the kinked area with the adjacent sealing strip material, it is advantageous to allow the elastic sealing material with the edge area to act on the backs of the folds in a nonpositive and/or physically bonded manner at the same time. The same thing is also true of the second sealing strip.

As an alternative to the design mentioned above, the elastic sealing material can be applied in the respective kink edge area of the first sealing strip "from beneath." In this way, the kink edge area of the second sealing strip is reinforced. With an elastic sealing compound applied in this way, it reinforces the fastening of the first sealing strips to the respective end fold areas in this area. In the case of the second sealing strip, the elastic sealing material can be applied "from beneath" in the same way in the edge area adjacent to the end folds. This is actually necessary for a peripheral seal in the case when the sealing material is applied "from beneath" to the first sealing strip. A tight connection is necessary because the filter insert is clamped between two filter housing halves in a self-supporting manner in the area of the protruding sealing strips with the elastic gasket provided there.

An advantageous exemplary embodiment which is explained in greater detail below is illustrated in the drawing, in which

A plate-shaped filter insert consists of a sheet of filter material 1 folded in a zigzag pleating pattern with peripheral sealing means. The sealing means comprise first sealing strips 2 which seal the end folds at the sides. The lateral first sealing strips 2 are bent outward with an edge area on the top side of the filter insert where the backs of the folds of filter material 1 form a plane so that these edge areas are situated approximately in the aforementioned plane.

In the longitudinal direction of the sheet of the filter insert, second sealing strips 3 are applied tightly across the longitudinal direction thereof to a freely tapering fold end area in each case, e.g., by gluing. For a tight connection of the second sealing strips 3 to the first sealing strips 2, the second sealing strips 3 are applied tightly in an overlapping pattern to the first sealing strips 2.

A strand of elastic sealing material is applied peripherally to the first and second sealing strips 2, 3 aligned in this way in the plane of the backs of the folds of the top side of a plate. When using polyurethane to form an elastic gasket, the polyurethane base material is applied in the form of a paste to the sealing strips 2, 3 for a subsequent foaming reaction.

To obtain a good strength between the sealing strips 2, 3, i.e., specifically the areas that are provided with the elastic sealing compound 4, with respect to the other filter insert areas, the elastic sealing material is applied to the sealing strips 2 and 3 in such a way that the edge area grips the filter material 1 in the area of the back of the folds in a nonpositive engagement. This embodiment of the applied elastic sealing compound 4 is depicted completely in the exemplary embodiment illustrated here.

Figure 1:
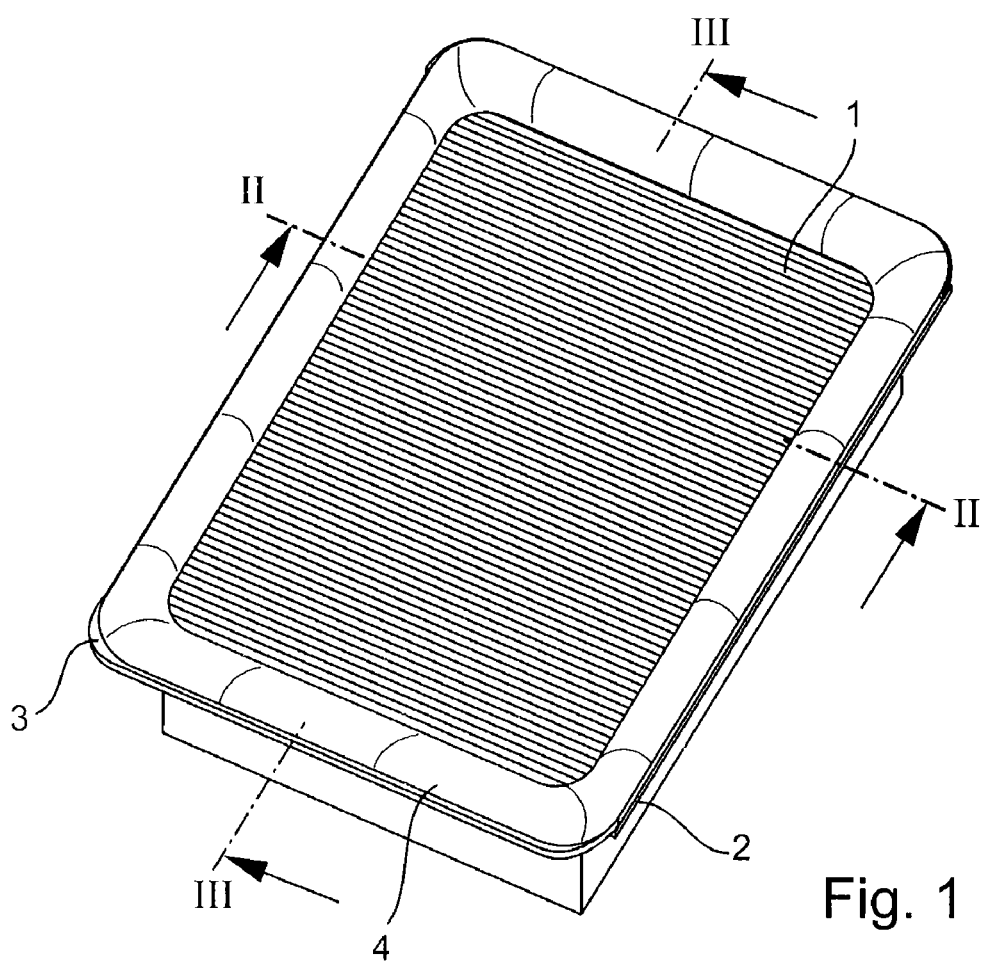
FIG. 1 shows a perspective view of a plate-shaped filter insert.
Figure 2:
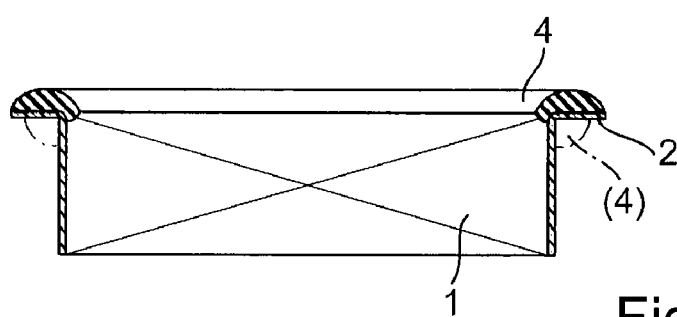
FIG. 2 shows a section along line II-II through the filter insert in FIG. 1.
Figure 3:
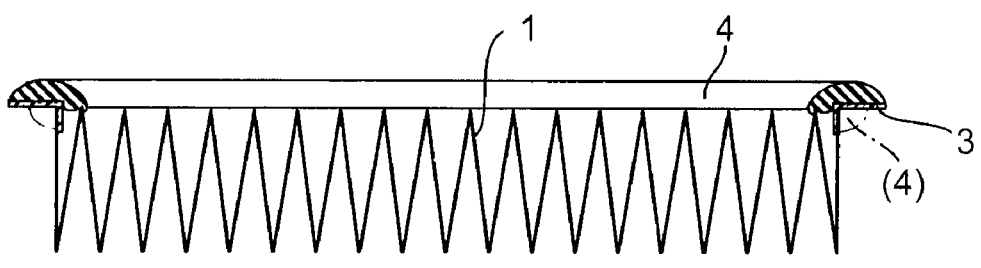
FIG. 3 shows a section along line III-III through the filter insert in FIG. 1.

According to an alternative embodiment, the elastic sealing material 4 is applied laterally into the inside edge areas of the first and second sealing strips 2, 5 "from beneath," as indicated by dash-dot lines for the sealing compound 4 in FIGS. 2 and 3.

All the features explained in the description and in the following claims may be essential to the invention whether used individually or combined together in any form.

The invention claimed is:

1. A plate-shaped filter insert, comprising:
   a filter material pleated in a zigzag fold to generally define two opposing plate-shaped surfaces;
   two lateral sealing strips sealing the folds on opposite ends of the filter material, the lateral sealing strips each bent to protrude outwards along one of the two opposing plate-shaped surfaces;
   two longitudinal sealing strips running across a longitudinal direction of the filter material, the longitudinal sealing strips each attached to an end fold of the filter material, the longitudinal sealing strips each secured to the lateral sealing strips; and
   a sealing compound applied about a periphery of the filter insert along the lateral and longitudinal sealing strips, wherein the sealing compound abuts a lateral edge area of a back portion of at least one of the folds of the filter material.

2. The plate-shaped filter insert of claim 1, wherein the peripheral sealing compound covers a kink area of the lateral sealing strips.

3. The plate-shaped filter insert of claim 1, wherein an edge area of the sealing compound protrudes beyond an associated lateral sealing strip to generally abut at least one fold of the filter material.

4. The plate-shaped filter insert of claim 1, wherein the sealing compound includes a foamable polyurethane material.

5. A plate-shaped filter insert, comprising:
a filter material pleated in a zigzag fold to generally define two opposing plate-shaped surfaces;
two lateral sealing strips sealing the folds on opposite ends of the filter material, the lateral sealing strips each bent to protrude outwards along one of the two opposing plate-shaped surfaces;
two longitudinal sealing strips running across a longitudinal direction of the filter material, the longitudinal sealing strips each attached to an end fold of the filter material, the longitudinal sealing strips each secured to the lateral sealing strips; and
a sealing compound applied about a periphery of the filter insert along the lateral and longitudinal sealing strips, wherein an edge area of the sealing compound protrudes beyond an associated lateral sealing strip to generally abut at least one fold of the filter material.

6. The plate-shaped filter insert of claim 5, wherein the peripheral sealing compound covers a kink area of the lateral sealing strips.

7. The plate-shaped filter insert of claim 5, wherein the sealing compound includes a foamable polyurethane material.

* * * * *